United States Patent [19]

Kobayashi

[11] Patent Number: 4,842,956
[45] Date of Patent: Jun. 27, 1989

[54] OPTO-MAGNETIC RECORDING MEDIUM HAVING THREE EXCHANGE-COUPLED MAGNETIC LAYERS

[75] Inventor: Tadashi Kobayashi, Yokohama, Japan

[73] Assignee: Canon Kabushiki Kaisha, Tokyo, Japan

[21] Appl. No.: 114,518

[22] Filed: Oct. 30, 1987

[30] Foreign Application Priority Data

Nov. 6, 1986 [JP] Japan .................. 61-262629

[51] Int. Cl.⁴ ............................. H01F 10/06
[52] U.S. Cl. .................... 428/611; 428/212; 428/336; 428/668; 428/682; 428/694; 428/900; 428/928
[58] Field of Search ............... 428/694, 900, 611, 668, 428/682, 928, 336, 212; 365/122; 369/13, 288; 360/131–135; 430/945

[56] References Cited

U.S. PATENT DOCUMENTS 4,347,112 8/1982 Togami ................. 204/192 M
4,556,291 12/1985 Chen ...................... 350/377
4,576,699 3/1986 Sato et al. ............. 204/192 M
4,693,943 9/1987 Kishi et al. ................. 428/678

OTHER PUBLICATIONS

Kobayashi et al. "Magnetization Process of Exchange Coupled Ferrimagnetic Double-Layered Films", Japanese Journal of Applied Physics vol. 20, No. 11, Nov. 1981, pp. 2089–2095.

Primary Examiner—George F. Lesmes
Assistant Examiner—James B. Monroe
Attorney, Agent, or Firm—Fitzpatrick, Cella, Harper & Scinto

[57] ABSTRACT

There is provided an opto-magnetic recording medium having an exchange-coupled three-layered structure in which a recording layer having a high coercive force and a low Curie temperature at room temperature is sandwiched between read layers having a low coercive force and a high Curie temperature, wherein an iron group auxiliary lattice magnetization dominant rare-earth and iron group amorphous alloy thin film is adopted as the recording layer and the read layers, and directions of spontaneous magnetization of the three layers are parallel to each other.

11 Claims, 3 Drawing Sheets

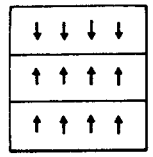
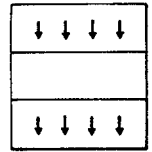
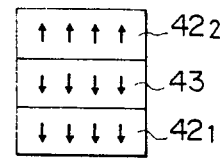
FIG. 7A  FIG. 7B  FIG. 7C  FIG. 7D
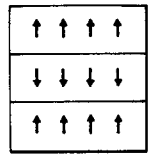
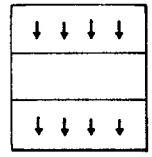
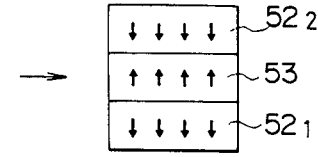
FIG. 8A  FIG. 8B  FIG. 8C
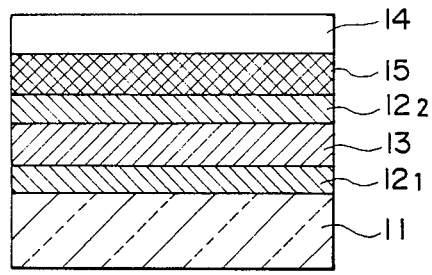
FIG. 9

OPTO-MAGNETIC RECORDING MEDIUM HAVING THREE EXCHANGE-COUPLED MAGNETIC LAYERS

BACKGROUND OF THE INVENTION

1. Field of the Invention

The present invention relates to an opto-magnetic recording medium used for an opto-magnetic memory and the like and, more specifically, to an opto-magnetic recording medium capable of thermo-magnetically recording data by radiation of light beams and reading out recorded data by using a magneto-optical effect.

2. Related Background Art

The conventional opto-magnetic recording medium has a structure as shown in FIG. 1. A substrate 1 is formed of glass, plastic, or the like. A magnetic film 2 serving as a recording layer and an $SiO_2$ protective layer 3 are formed on the substrate 1. As the magnetic film 2, a rare-earth iron amorphous alloy thin film is often used because of easy fabrication. When data is recorded on the recording medium, the magnetic film 2 is magnetized in advance in a predetermined direction, and a light beam intensity-modulated with a data signal is radiated thereon. A portion irradiated with the light beam is heated to near a Curie temperature, and its coercive force is decreased. Thus, an inverted magnetic domain is formed by an externally applied magnetic field. The inverted magnetic domain serves as a recording pit indicating data. The recorded data can be read out using the magneto-optical effect upon radiation of linearly polarized light beam.

In the opto-magnetic recording medium, in order to improve recording sensitivity, a magnetic film having a low Curie temperature must be used. On the other hand, in order to perform read access with a high S/N ratio, the higher magneto-optical effect is preferable. The level of the magneto-optical effect is represented by a Kerr rotation angle indicating the degree of rotation of the radiated light beam polarization direction by a magnetic film. However, in general, if the rare-earth iron alloy has a larger Kerr rotation angle, it tends to have a higher Curie temperature. Therefore, it is difficult to obtain a medium which can satisfy both the requirements of high recording sensitivity and a high reproduction S/N ratio.

In Japanese Patent Laid-Open Application No. 78652/1982 (U.S. counterpart application: U.S. Ser. No. 908,934 which is the continuation appln. of the CIP appln. Ser. No. 644,134 which is the CIP of U.S. Ser. No. 315,467), an opto-magnetic recording medium having two magnetic layers is proposed, as shown in FIG. 2. Referring to FIG. 2, a second magnetic layer 4 of GdFe, GdFeCo, or the like, a first magnetic layer 5 of TbFe, DyFe, or the like and a protective layer 3 of a dielectric material are formed on a substrate 1. The second magnetic layer 4 has a lower coercive force and a higher Curie temperature than those of the first magnetic layer 5. These magnetic layers are exchange-coupled to each other. Recording is performed by heating these magnetic layers near the Curie temperature of the first magnetic layer by light beam radiation. Thus, an inverted magnetic domain is simultaneously formed in the two layers by an exchange-coupling force. In reproduction, a light beam is radiated onto the second magnetic layer 4 from the side of the substrate 1, thereby reading out data with a high S/N ratio. The double-layered magnetic layer structure is also described in "Magnetization Process of Exchange-Coupled Ferrimagnetic Double-Layered Films" Kobayashi et al., Japanese Journal of Applied Physics Vol. 20, No. 11, November, 1981, pp. 2089-2095 and "Thermomagnetic Writing on Exchange-Coupled Amorphous Rare-Earth Iron Double-Layer Films" Tsunashima et al., IEEE Transactions on Magnetics, Vol. MAG-17, No. 6, November 1981, pp. 2840-2842, in addition to the abovementioned patent.

In Japanese Patent Laid-Open Application No. 117747/1986, a double-layered opto-magnetic recording medium which adopts Tb—Fe and Gd—Fe—Co as a recording layer and a read layer, respectively, whose directions of spontaneous magnetization (net magnetization) are parallel to each other, is proposed. The present applicant proposed a three-layered opto-magnetic recording medium having two corrosion-resistive read layers interposing a read layer therebetween in order to improve corrosion resistance of the medium in Japanese Patent Application No. 159716/1986 (U.S. Application Ser. No. 071,081: same assignee).

SUMMARY OF THE INVENTION

The present inventors have made extensive studies on an opto-magnetic recording medium having an exchange-coupled three-layered structure. As a result, it was found that the recording sensitivity and reproduction characteristics of the medium had noticeable composition dependency. The present invention has been made based on this finding, and has as its object to provide a three-layered structure opto-magnetic recording medium having optimal recording/reproduction characteristics.

In order to achieve the above object, there is provided an opto-magnetic recording medium having an exchange-coupled three-layered structure in which a recording layer having a high coercive force and a low Curie temperature at room temperature is sandwiched between read layers having a low coercive force and a high Curie temperature, wherein an iron group auxiliary lattice magnetization dominant rare-earth and iron group amorphous alloy thin film is adopted as the recording layer and the read layers, and directions of spontaneous magnetization of the three layers are parallel to each other.

BRIEF DESCRIPTION OF THE DRAWINGS

FIGS. 7A to 8C are schematic views showing recording processes when a medium having a structure different from that of the present invention is employed; and FIG. 9 is a schematic sectional view showing an opto-magnetic recording medium according to another embodiment of the present invention.

DETAILED DESCRIPTION OF THE PREFERRED EMBODIMENTS

Figure 1:
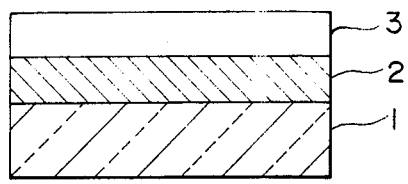
FIGS. 1 and 2 are schematic sectional views respectively showing structures of conventional optomagnetic recording media.
Figure 2:
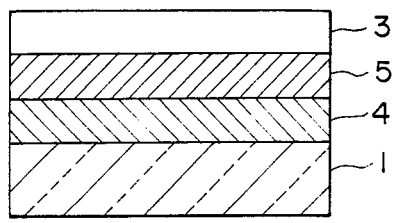
Figure 3:
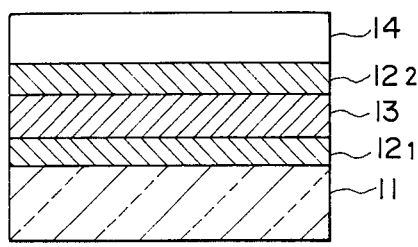
FIG. 3 is a schematic sectional view showing an opto-magnetic recording medium according to an embodiment of the present invention.

FIG. 3 is a schematic sectional view showing a structure of an opto-magnetic recording medium according to an embodiment of the present invention. In FIG. 3, a transparent substrate 11 is formed of glass, plastic, or the like. A second magnetic layer $12_1$, a first magnetic layer 13, a second magnetic layer $12_2$, and a protective layer 14 are sequentially stacked on the substrate 11. The first magnetic layer 13 is formed of a rare-earth and iron group amorphous alloy thin film in which iron group auxiliary lattice magnetization is dominant, and has a relatively low Curie temperature and a high coercive force. The two second magnetic layers $12_1$ and $12_2$ are also formed of an iron group auxiliary lattice magnetization dominant rare-earth and iron group amorphous alloy thin film, and have a lower coercive force and a higher Curie temperature than those of the first magnetic layer 13.

The second magnetic layers $12_1$ and $12_2$ are respectively exchange-coupled to the first magnetic layer 13. All these first and second magnetic layers exhibit perpendicular magnetic anisotropy while they are coupled. Furthermore, directions of spontaneous magnetization of the second magnetic layers $12_1$ and $12_2$ are parallel to that of the first magnetic layer, i.e., direct in the same direction.

The protective layer 14 is adopted to protect the magnetic layers from being corroded or damaged, and as a material therefore, a dielectric such as SiO, $SiO_2$, SiC, SiN, AlN, $TiO_2$, ZnS, or the like is preferably used.

These magnetic layers and the protective layer are prepared by depositing the above-mentioned materials on the substrate by deposition or sputtering in a vacuum atmosphere. In this case, in order to exchange-couple the first and second magnetic layers, a vacuum pressure in the preparation apparatus is increased, and these layers are continuously formed so that interfaces between these magnetic layers do not absorb a residual gas.

Spontaneous magnetization will be described in detail. The rare-earth and iron group amorphous alloy thin film is a ferrimagnetic member, and its spontaneous magnetization (magnetization measured in practice) corresponds to a difference between rare-earth-based auxiliary lattice magnetization and iron group-based auxiliary lattice magnetization. For example, in FIG. 4, directions of rare-earth-based auxiliary lattice magnetization 16 and iron group-based auxiliary lattice magnetization 17 are always opposite to each other. Spontaneous magnetization 18 corresponds to a difference between these two auxiliary lattice magnetization vectors. When the rare-earth-based auxiliary lattice magnetization is larger, the direction of the rare-earth-based auxiliary lattice magnetization is parallel to that of the spontaneous magnetization 18, and this state is called a rare-earth-based auxiliary lattice magnetization dominant state. On the other hand, when the iron group-based auxiliary lattice magnetization 27 is larger than the rare-earth-based auxiliary lattice magnetization 26, the direction of the iron group-based auxiliary lattice magnetization 27 is parallel to that of the spontaneous magnetization 28, and this state is called an iron group-based auxiliary lattice magnetization dominant state.

Figure 4:
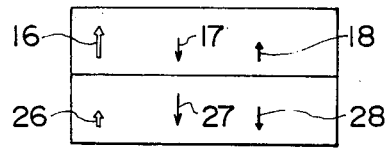
FIG. 4 is a schematic view showing a state of magnetization in an exchange-coupled double-layered film comprising a rare-earth auxiliary lattice magnetization dominant film and an iron group auxiliary lattice magnetization dominant film.

An exchange-coupled film consisting of a rare-earth-based auxiliary lattice magnetization dominant film and an iron group-based auxiliary lattice magnetization dominant film shown in FIG. 4 is taken into consideration. If a coercive force of one layer is much smaller than that of the other layer, the directions of rare-earth-based auxiliary lattice magnetization vectors of both the layers are parallel to each other by an exchange coupling force, and the directions of iron group-based auxiliary lattice magnetization vectors thereof are also parallel to each other. Therefore, the directions of spontaneous magnetization of these layers are opposite to each other. If rare-earth- or iron group-based auxiliary lattice magnetization of both the layers is dominant, the directions of spontaneous magnetization are also parallel to each other.

As can be seen from the above description, in the exchange-coupled three-layered film, various combinations of dominant auxiliary lattice magnetization of the respective layers can be considered.

Figure 5:
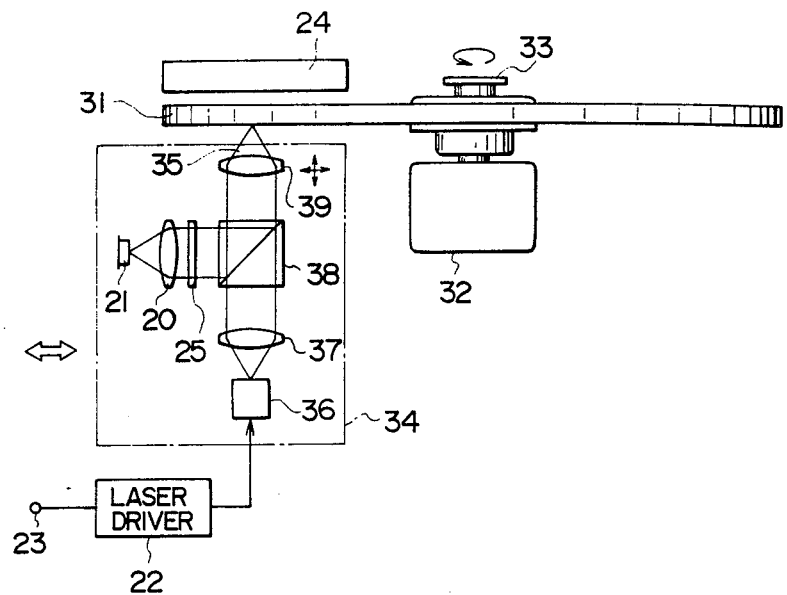
FIG. 5 is a schematic view showing an apparatus for recording and reproducing data using the medium of the present invention.

A recording operation using the medium of the present invention will be described. FIG. 5 is a schematic view of an opto-magnetic recording apparatus for performing the recording operation. The recording apparatus shown in FIG. 5 includes a disk-shaped optomagnetic recording medium (opto-magnetic disk) 31, a spindle motor 32 for rotating the disk 31, a clamper 33 for fixing the disk 31 to the rotating shaft of the motor 32, and an optical head 34 for radiating a light beam 35 onto the disk 31. The optical head 34 incorporates a laser light source 36 comprising a semiconductor laser or the like, a collimator lens 37, a beam splitter 38, an objective lens 39, a sensor lens 20, an analyzer 25, and a photodetector 21. The optical head 34 can be moved in the radial direction by a mechanism (not shown). The objective lens 39 is moved along an optical axis and in a direction perpendicular to the optical axis in accordance with a control signal detected by the photodetector 21 by a known method to perform so-called auto-tracking (AT) and auto-focusing (AF). The laser light source 36 is driven by a laser driver 22, and emits the light beam 35 which is intensity-modulated in accordance with recording data input at an input terminal 23, as will be described later.

A magnetic field generation means 24 is provided at a position opposite to the optical head 34 to interpose the disk 31 therebetween, and applies a bias magnetic field in a predetermined direction onto a portion of the disk 31 irradiated with the light beam 35.

Figures 6A, 6B, 6C:
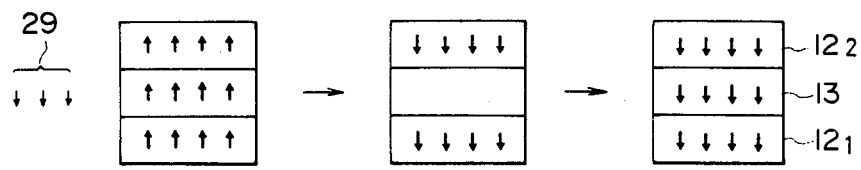
FIGS. 6A to 6C are schematic views showing recording processes of the medium of the present invention.

When data is recorded using the opto-magnetic recording medium shown in FIG. 3, the first and second magnetic layers are magnetized in advance in a predetermined direction (upward or downward direction), as shown in FIG. 6A. These magnetic layers are scanned, from the side of the substrate 11 or the protective layer 14, with the light beam 35 which is modulated in accordance with data while applying a bias magnetic field 29 from the magnetic field generation means 24. A portion irradiated with the light beam is heated to about a Curie temperature of the first magnetic layer 13, and the first magnetic layer 13 is demagnetized, as shown in FIG. 6B. In this case, the direction of magnetization of this portion in both the first and second magnetic films is inverted by the influence of the bias magnetic field, as shown in FIG. 6C. After the light beam has passed, an inverted magnetic domain corresponding to the data is formed as a recording pit. When the data recorded as described above is to be reproduced, a linearly polarized light beam is radiated from the substrate 11 side or the protective layer 14 side. Light reflected by the medium and is modulated in a direction of polarization in accordance with the direction of magnetization of the magnetic layers is detected to read out the data. At this time, when the reflected light is received by the photodetector 21 through the analyzer 25, a change in direction of polarization can be modulated and detected as an intensity.

In this invention, when all the first and second magnetic layers are iron group-based auxiliary lattice dominant, and have parallel spontaneous magnetization vectors, excellent recording/reproduction characteristics can be obtained. This will be described below.

For the sake of comparison, as shown in FIGS. 7A to 7D, assuming a case wherein read layers $42_1$ and $42_2$ have opposite dominant auxiliary lattice magnetization vectors. In this exchange-coupled three-layered film, the recording characteristics were unstable. The reason therefor will be described below. Before a recording operation, the film is magnetized in a state shown in FIG. 7A (if the directions of magnetization of the read layers $42_1$ and $42_2$ are opposite to each other, even if the directions of magnetization do not correspond to those illustrated in FIG. 7A, the following description can be applied). Assume that the magnetic field 29 is applied downward in FIG. 7A to heat the film by the laser beam, thereby performing recording. When the temperature of a recording layer 43 exceeds the Curie temperature by heating with the laser beam, the recording layer 43 demagnetized, and no exchange coupling force is applied across the recording layer and the read layers. Therefore, as shown in FIG. 7B, the directions of magnetization of the read layers $42_1$ and $42_2$ are directed downward by the external magnetic field. When the temperature of the film is decreased after the laser beam radiation is completed, the recording layer 43 is magnetized again. In this case, both a case wherein recording can be achieved by the exchange coupling force of the read layer $42_1$, as shown in FIG. 7C, and a case wherein recording is not achieved by the exchange coupling force of the read layer $42_2$, as shown in FIG. 7D, may occur. For this reason, it is considered that the recording characteristics are unstable. This point will be explained below in more detail.

When the temperature falls from the state shown in FIG. 7B and net magnetization appears in the recording layer 43, the direction of magnetization (upward or downward) mainly depends on levels of exchange coupling forces applied from the read layers $42_2$ and $42_1$ to the recording layer 43.

When the influence of the read layer $42_1$ is larger, since the spontaneous magnetization of the read layer $42_1$ and the recording layer 43 is stable when directions of the spontaneous magnetization are parallel to each other, the spontaneous magnetization of the read layer $42_2$ and the recording layer 43 is directed downward in FIG. 7C. Meanwhile, since the spontaneous magnetization of the read layer $42_2$ and the recording layer 43 is stable when directions of the spontaneous magnetization are opposite to each other, the spontaneous magnetization of the read layer $42_2$ is inverted to the state shown in FIG. 7B. Since this state corresponds to an opposite magnetization state shown in FIG. 7A, recording is achieved.

On the other hand, if the influence of the read layer $42_2$ is larger, since the spontaneous magnetization of the read layer $42_2$ and the recording layer 43 is stable when directions of the spontaneous magnetization are opposite to each other, the spontaneous magnetization of the read layer $42_2$ is directed downward in FIG. 7D, and the spontaneous magnetization of the recording layer 43 is directed upward. Meanwhile, since the spontaneous magnetization of the read layer $42_1$ and the recording layer 43 is stable when directions of the spontaneous magnetization are parallel to each other, the spontaneous magnetization vector of the read layer $42_1$ is opposite to that in FIG. 7B. Since this state is the same magnetization state as in FIG. 7A, recording is not achieved.

The degrees of the influence of the read layers $42_1$ and $42_2$ depend on the properties of the interfaces between the layers $42_2$ and 43 and between the layers $42_1$ and 43, and also depend on preparation conditions or a slight difference in composition.

Therefore, some disks can record data as shown in FIG. 7C, and some disks cannot record data as shown in FIG. 7D. In this manner, the recording characteristics are unstable.

As can be seen from the above description, it is preferable that the same auxiliary lattice magnetization in the read layers is dominant in the read layers.

Assume that rare-earth-based auxiliary lattice magnetization is dominant in both the read layers. This exchange-coupled three-layered film has poor recording characteristics, and exhibits large recording laser power dependency. The reason is associated with a recording process in the exchange-coupled film as follows. In recording, the temperature of the film is increased by the laser beam, and has reached the Curie temperature of the recording layer to demagnetize the recording layer. No exchange coupling force is applied between the read layers and the recording layer, and the magnetization of the read layers is inverted by the external magnetic field. In this case, the coercive force of the read layer must be as low as one that can be easily inverted by the external magnetic field. In general, in a rare-earth and iron group amorphous alloy thin film used for the read layer, if rare-earth-based auxiliary lattice magnetization is dominant, the coercive force is increased upon an increase in temperature. When the temperature is further increased beyond a compensation temperature, the coercive force is decreased. Meanwhile, if iron group-based auxiliary lattice magnetization is dominant, the coercive force is linearly decreased upon an increase in temperature. More specifically, when iron group-based auxiliary lattice magnetization is dominant, it is advantageous to sufficiently decrease the coercive force.

Therefore, it is preferable that the same auxiliary lattice magnetization is dominant and iron group-based auxiliary lattice magnetization is dominant in the read layers.

Finally, two cases will be compared wherein rare-earth-based auxiliary lattice magnetization is dominant in the recording layer, and wherein iron group-based auxiliary lattice magnetization is dominant in the recording layer. FIGS. 8A to 8C show a case wherein iron group-based auxiliary lattice magnetization is dominant in both read layers $52_1$ and $52_2$, and rare-earth-based auxiliary lattice magnetization is dominant in a recording layer 53. The directions of magnetization of the read layers $52_1$ and $52_2$ are opposite to that of the recording layer 53. FIGS. 6A to 6C show an optimized exchange-coupled three-layered film according to the present invention, in this film, iron-based auxiliary lattice magnetization is dominant in all the read layers 12₁ and 12₂ and the recording layer 13, and the directions of magnetization of the read layers 12₁ and 12₂ are parallel to that of the recording layer 13. Upon comparison between FIGS. 6A to 6C and 8A to 8C, the film shown in FIGS. 6A to 6C has better recording and reproduction characteristics.

This is because in the case of FIGS. 8A to 8C, the coercive force of the recording layer 53 is increased beyond a normal value by the exchange coupling force from the read layers 52₁ and 52₂, while in the case of FIGS. 6A to 6C, the coercive force of the recording layer is decreased below a normal value, and recording is facilitated. In FIGS. 6A to 6C, a larger recording magnetic domain can be formed with the same laser power, and a reproduction signal can be increased.

Consequently, iron group-based auxiliary lattice magnetization is preferably dominant in both the recording and read layers.

As materials for the recording layer, i.e., the first magnetic layer of the opto-magnetic recording medium of the present invention, Tb—Fe, Dy—Fe, Gd—Tb—Fe, Gd—Dy—Fe, Tb—Dy—Fe, Tb—Fe—Co, Dy—Fe—Co, Gd—Tb—Fe—Co, Gd—Dy—Fe—Co, Tb—Dy—Fe—Co, and the like, or ones to which Cr and/or Al are added, are preferable. If films of these compositions are expressed as $(Re_{1-x}RE'_x)$-$(Fe_{1-y}Co_y)$ (where RE and RE' are rare-earth elements), their Curie temperatures can be approximately expressed:

$$(1-x)Tc + xTc' + 600y \; (°C.)$$

where Tc and Tc' are respectively Curie temperatures of RE—Fe and RE'—Fe, and in the case of Gd—Fe, the Curie temperature is about 220°C.; Tb—Fe, about 130° C.; and Dy—Fe, about 70° C. The Curie temperature of the recording layer is preferably decreased as low as possible as long as temperature stability of recorded data is not influenced, and is preferably set to be about 100° C. When the recording layer comprises Tb—Fe, excellent recording characteristics can be obtained. When the Curie temperature is decreased to improve corrosion resistance, Cr and Al may be employed. If these elements are added, the Curie temperature is decreased by about 5° C. per atm. % by Cr and by about 3° C. per atm. % by Al. An amount of these elements to be added preferably falls within the range of 5 to 20 atm. %. The types or compositions of the rare-earth or iron group elements are controlled so as to obtain an appropriate Curie temperature after the above elements are added. The thickness of the recording layer preferably falls within the range of 100 to 500 ÅÅ.

As materials for the read layers, i.e., the second magnetic layers of the opto-magnetic recording medium of the present invention, Gd—Fe, Gd—Fe—Co, Gd—Co, and the like, or ones to which Cr and/or Al are added thereto are preferable. When Gd—$(Fe_{1-y}Co_y)$ is employed, the read characteristics can be maximized when Y=0.3. The sole coercive force of the read layer is preferably decreased, and is preferably several tens to 100 Oe. If the coercive force of the read layer is large, the bias magnetic field required for recording is increased. If the coercive force of the read layer is too large, even if iron group-based auxiliary lattice magnetization is dominant in both the read and recording layers, the directions of net magnetization of the three layers cannot often be parallel to each other, and the three layers may not record the same data. If the coercive force of the read layer is too large, the data in the recording layer cannot be printed through to the read layer by the exchange coupling force. Therefore, when the sole coercive force of the read layer is small, the exchange interaction is effective, and directions of net magnetization of the three layers are parallel to each other, data can be correctly recorded. The thickness of each read layer preferably falls within the range of 200 to 500 Å.

(Example)

A dielectric layer ZnS (thickness: 800Å), a read layer Gd—Fe—Co (300Å), a recording layer Tb—Fe (200Å), a read layer Gd—Fe—Co (300Å), and a dielectric layer ZnS (800Å) were sequentially formed on a polycarbonate substrate having a groove pitch of 1.6 μm and a diameter of 130 mm, and four opto-magnetic memory media were prepared. In order to prepare a rare-earth-based auxiliary lattice magnetization dominant film, a composition of the rare-earth elements was increased as compared to a compensation composition, and in order to form an iron group-based auxiliary lattice magnetization dominant film, a composition of the iron group elements was increased as compared to a compensation composition, Recording and erase operations were performed for the respective samples. A rotational speed was 3,600 rpm, a bias magnetic field upon recording was 200 Oe, and a bias magnetic field upon erasing was −400 Oe. In media in which rare-earth-based auxiliary lattice magnetization was dominant in both the read layers and rare-earth-based or iron group-based auxiliary lattice magnetization was dominant in the recording layer, a laser power of 7 to 8 mW or higher necessary for recording was required. Meanwhile, in a medium in which iron group-based auxiliary lattice magnetization was dominant in both the read layers and rare-earth-based auxiliary lattice magnetization was dominant in the recording layer, a laser power of only 5 mW was required. Furthermore, in the medium of the present invention wherein iron group-based auxiliary lattice magnetization was dominant in the read and recording layers, a laser power of only 4 mW was required. For the read characteristics, the medium of the present invention had a higher CN ratio than that of other media by 2 to 3 dB.

FIG. 9 is a schematic sectional view showing a structure according to another embodiment of the present invention. The same reference numerals in FIG. 9 denote the same parts as in FIG. 3, and a detailed description thereof will be omitted. A difference between this embodiment and the above embodiment is that a reflection layer 15 formed of a metal film such as an Al, Cu, or Ag film is formed on a second magnetic layer 12₂. The reflection layer 15 reflects a light beam passing through the first and second magnetic layers from the side of a substrate 11 to cause the light beam to again transmit through the magnetic layers, thus effectively utilizing a light beam.

The present invention is not limited to the above embodiments, and various other changes and modifications may be made. For example, a protective layer formed of a dielectric or an optical thin film causing a reflection prevention effect may be provided between the transparent substrate and the second magnetic layer. The present invention includes such applications.

I claim:

1. An opto-magnetic recording medium comprising:

a substrate;

a first magnetic layer formed on said substrate and having perpendicular magnetic anisotropy, said first magnetic layer consisting of a rare-earth and iron group amorphous alloy thin film whose iron group auxiliary lattice magnetization is dominant; and second magnetic layers respectively formed on two major surfaces sides of said first magnetic layer and having perpendicular magnetic anisotropy, said second magnetic layers having a lower coercive force and a higher Curie temperature than those of said first magnetic layer, and being respectively exchange-coupled to said first magnetic layer and each of said second magnetic layers consisting of a rare-earth and iron group amorphous alloy thin film whose iron group auxiliary lattice magnetization is dominant, and having a direction of spontaneous magnetization parallel to that of said first magnetic layer.

2. A medium according to claim 1, wherein said medium further comprises a protective layer formed on said magnetic layer on a side opposite to said substrate.

3. A medium according to claim 1, wherein said medium further comprises a reflection layer formed on one side of said magnetic layer.

4. A medium according to claim 1, wherein said first magnetic layer is formed of a material selected from a group consisting of Tb—Fe, Dy—Fe, Gd—Tb—Fe, Gd—Dy—Fe, Tb—Dy—Fe, Tb—Fe—Co, Dy—Fe—Co, Gd—Tb—Fe—Co, Gd—Dy—Fe—Co, and Tb—Dy—Fe—Co.

5. A medium according to claim 4, wherein 5 to 20 atomic % of Cr and/or Al are added to said first magnetic layer.

6. A medium according to claim 1, wherein said second magnetic layers are formed of a material selected from a group consisting of Gd—Fe, Gd—Fe—Co, and Gd—Co.

7. A medium according to claim 6, wherein 5 to 20 atomic % of Cr and/or Al are added to said second magnetic layer.

8. A medium according to claim 1, wherein said first magnetic layer has a Curie temperature of about 100° C.

9. A medium according to claim 1, wherein said second magnetic layers each have a coercive force of several tens of Oe to 100 Oe.

10. A medium according to claim 1, wherein a thickness of said first magnetic layer falls within a range of 100 to 500 Å.

11. A medium according to claim 1, wherein a thickness of said second magnetic layers fall within a range of 200 to 500 Å.

* * * * *

UNITED STATES PATENT AND TRADEMARK OFFICE
CERTIFICATE OF CORRECTION

PATENT NO. : 4,842,956
DATED : June 27, 1989
INVENTOR(S) : TADASHI KOBAYASHI, ET AL.

It is certified that error appears in the above-identified patent and that said Letters Patent is hereby corrected as shown below:

COLUMN 2

Line 50, "optomagnetic" should read --opto-magnetic--.

COLUMN 4

Line 25, "optomag-" should read --opto-mag- --.

COLUMN 7

Line 51, "500 ÅA." should read --500 Å.--.

COLUMN 8

Line 24, "composition," should read --composition.--.

COLUMN 9

Line 9, "sides" should be deleted.
Line 15, "layer" should read --layer,--.

UNITED STATES PATENT AND TRADEMARK OFFICE
CERTIFICATE OF CORRECTION

PATENT NO. : 4,842,956

DATED : June 27, 1989

INVENTOR(S) : TADASHI KOBAYASHI, ET AL.

It is certified that error appears in the above-identified patent and that said Letters Patent is hereby corrected as shown below:

COLUMN 10

Line 26, "fall" should read --falls--.

Signed and Sealed this

Third Day of July, 1990

Attest:

HARRY F. MANBECK, JR.

*Attesting Officer*   *Commissioner of Patents and Trademarks*